(12) United States Patent
Li

(10) Patent No.: US 8,671,689 B2
(45) Date of Patent: Mar. 18, 2014

(54) METHOD AND DEVICE OF TURBINE SUBMERGED COMBUSTION BOILER

(76) Inventor: Weicheng Li, Lansdale, PA (US)

( * ) Notice: Subject to any disclaimer, the term of this patent is extended or adjusted under 35 U.S.C. 154(b) by 1355 days.

(21) Appl. No.: 11/881,420

(22) Filed: Jul. 28, 2007

(65) Prior Publication Data

US 2008/0035078 A1 Feb. 14, 2008

(30) Foreign Application Priority Data

Aug. 9, 2006 (CN) .......................... 2006 1 0109299

(51) Int. Cl.
*F02G 5/02* (2006.01)
(52) U.S. Cl.
USPC ............................................ 60/730; 603/39.5
(58) Field of Classification Search
USPC ............... 60/39.5, 39.511, 39.17, 730, 39.57, 60/806, 221, 222; 122/31.1, 31.2; 392/451
See application file for complete search history.

(56) References Cited

U.S. PATENT DOCUMENTS

| 2,956,402 | A | * | 10/1960 | Rae | ................................. | 60/774 |
| 5,735,235 | A | * | 4/1998 | Li | ................................. | 122/1 R |
| 6,634,433 | B2 | * | 10/2003 | Kim et al. | ........................ | 169/52 |
| 7,168,395 | B2 | * | 1/2007 | Engdahl | ........................ | 122/31.1 |

* cited by examiner

*Primary Examiner* — Andrew Nguyen
(74) *Attorney, Agent, or Firm* — Ming Chow; Sinorica, LLC

(57) ABSTRACT

The invention is about a submerged combustion method and the device; specifically, it is a submerged combustion method and the device utilizing turbine heat engine principle. In the invention, turbine power combustion means is used and substitutes the conventional submerged combustion system that must equip air blowing means. The high temperature gases generated from the combustion within the turbine power combustion means will do work on the turbine, which will drive the air compressor means of the turbine power combustion means to induce air for combustion, and will drive the second-time complete combustion of high temperature gases and the complement fuel, and then the gases will come out from water bottom against tank water pressure and carry out heat interchange with tank water. The turbine submerged combustion boiler device of the invention need not equip air blowing means which would consume additional energy. Thus, it has high energy efficiency and a simple system structure. Additionally, it has features of high heat interchange rate, stable long term heat efficiency, environmental protection, etc.

6 Claims, 1 Drawing Sheet

METHOD AND DEVICE OF TURBINE SUBMERGED COMBUSTION BOILER

FIELD OF THE INVENTION

The present invention is about a submerged combustion method and device, and more particularly, it is a submerged combustion method and device utilizing turbine heat engine principle.

BACKGROUND OF THE INVENTION

Submerged combustion method, which is also referred to as in-liquid combustion method, is a new type of combustion technology. Fuel and air are fully mixed and fed into combustion chamber for complete combustion, and the generated high temperature gas is expelled into liquid directly to heat up the liquid. The combustion process of submerged combustion method implements a heat transfer process that is a direct-contact heat transfer process.

As a high efficiency heat transfer method, submerged combustion method has been used in such industries as chemical industry, etc. Due to the fact of its high heat transfer efficiency comparing to other heat transfer methods, both domestic and international thermal energy industries started to focus on applying this method in small size boilers, in order to improve heat energy consumption efficiency and saving fuel.

For the existing submerged combustion boilers, an additional blower is needed for blowing air into the combustion chamber in order to mix with fuel and combust. Then the high temperature gas will be expelled against water pressure into water for heat exchange. Due to the fact that the additional blower must meet the requirements for high pressure and large air flow, considerable extra energy has to be consumed, which will comprise the high efficiency associated with the submerged combustion method. American U.S. Pat. No. 5,735,235 "METHOD AND SYSTEM FOR HEATING A LIQUID" has provided a submerged combustion method and system, which has applied the energy saving principle of "Using combustion heat energy directly to suck in the required air for combustion". But because it used a piston type engine burner and a direct-jet heat exchange method, the invention disclosed in this patent has the disadvantages of high mechanical energy consumption, limited exhausting pressure, low air utilizing rate, etc. So, its systematic energy utilization rate can still be improved.

SUMMARY OF THE INVENTION

In view of the aforementioned drawbacks, the objective of the present invention is to provide a working method and device of submerged turbine combustion boiler utilizing the turbine heat engine principle, in order to improve the energy efficiency.

The technical solution being adopted in the current invention will solve the following technical problem.

A submerged combustion process utilizing turbine heat engine principle, comprising:
(I) Mixing fuel and air for being combusted in the combustion chamber of the turbine power combustion assembly. The generated high temperature gas will expel and flow to the tail part of the turbine power combustion assembly. Meanwhile, the gas works on the turbine unit of the turbine power combustion assembly with its flows to lead the turbine to rotate and further drives the air compressor unit of the turbine power combustion assembly. The air compressor unit next blows air into the combustion chamber of the turbine power combustion assembly through an air intake pipe.
(2) The high temperature gas first goes into a pressurizing pipe unit through tail jet pipe unit of the turbine power combustion assembly, and then goes into the secondary combustion chamber following its deceleration, which will increase the pressure in pressurizing pipe.
(3) In the secondary combustion chamber, the excessive air within the high temperature gas is mixed with replenishing fuel and is fed to the second combustion chamber, to accomplish a complete secondary combustion.
(4) The gas generated in the secondary combustion is expelled into water for heat exchange via a guiding exhaust pipe unit.

A device using submerged combustion process in accordance with turbine heat engine principle, i.e. turbine submerged combustion boiler, including a water tank, a flow guide cylinder within the tank; a turbine power combustion assembly set in the flow guide cylinder. The fuel, assistant material and electricity power are supplied via pipes for fuel, assistant material and electricity. The water tank is set with cool water inlet and gas exhaust port on its top. The flow guide cylinder is set with hot water outlet. The turbine power combustion assembly includes an air compressor unit, a combustion chamber, an external air channel, a turbine and tail jet pipe unit. The air compressor unit has an air intake pipe at its front side; the tail jet pipe unit connects with the pressurizing pipe unit at the outlet; the pressurizing pipe unit connects with secondary combustion chamber at the end; the secondary combustion chamber is set with fuel replenishing nozzle; the secondary combustion chamber connects with the guide exhaust pipe unit.

Air intake check valve is set in front of the air intake pipe unit.

The pressurizing pipe unit is a smooth pipeline, with a narrow inlet part and a wide outlet part.

The combustion chamber of the turbine power combustion assembly is installed with an external air channel on its outer layer. The front end of the external air channel connects with the outlet of the air compressor unit. Its rear end connects with the pressurizing pipe unit.

The external air channel is open to the outside; so as to allow cold air filling in the combustion chamber and the whole turbine as well. The air will be expelled to the pressurizing pipe unit directly. In this way, the scale deposition on the external surface of the combustion chamber and the associated heat dissipation problem can be avoided. The turbine power combustion assembly can be cooled down stably and reliably.

The terminal part of tail jet pipe unit is in either linear form or diffuser form. Normally, the tail jet pipe unit is designed as a reducer form in order to obtain high speed gas. For the turbine submerged combustion boiler of the present invention, such high speed gas is nonetheless not necessary. Hence it has been designed as linear or diffuser type, which will reduce the resistance and the energy consumption as well.

The invention, a working method and device of turbine submerged combustion boiler utilizing turbine heat engine principle, has the following advantages:
(1) Low Heat Energy Loss The burner part, as a heat source, is submerged into the water to be heated, and actually the whole assembly is being enclosed in the water. The heat generated from combustion has no chance to dissipate to the outside directly; thus the heat loss from the heat source to the exterior is almost zero.
(2) High Heat Exchange Efficiency and High Speed High temperature gas produced by the complete combustion will mix with the water and will exchange its heat with the water in the form of a large quantity of micro bubbles. In this way, there would be no area limitation and no heat resistance loss due to the sediment. Thus, it has a large heat exchanging area, short exchanging route and low heat resistance. With the large quantity of micro bubbles floating up in the water, it will lead to an intensive all-around stirring up effect. Thus, the heat exchanging is fast and effective. The most advantageous feature of the present invention is that the exhausted gas will finally have a temperature close to water temperature; suggesting the combustion heat utilization has been maximized.

(3) Long Term Stable Heat Efficiency

Because there's no heat exchanger, the problem of boiler sedimentation has been completely avoided. The long term heat efficiency will be significantly higher than that of the existing boilers. The service life will also be significantly prolonged.

(4) Premium Quality and Environmentally-Protection

The final exhausted gas from the turbine submerged combustion boiler will be filtered and purified by water automatically. Thus, it is environmentally protective, saves gas purification equipments and the potential heat loss from these equipments will be avoided.

(5) Low Cost

Because such complex and huge heat exchanger has been avoided, the feeding water pre-treat system to prevent sediment can be simplify or even omitted. The air blowing equipment to supply combustion-assistant air as well as the gas purification equipment are both saved. This new type of boiler device has the beneficial features of simple equipment structure, small occupying space, low system cost, and low maintenance cost, etc.

BRIEF DESCRIPTION OF THE DRAWINGS

The present invention will be further described in details with reference to the accompanying drawings and embodiment.

Where:

| | |
|---|---|
| 1. Water tank | 2. Flow guiding cylinder |
| 3. Turbine power combustion assembly | 4. Cool water inlet |
| 5. Gas exhaust port | 6. Hot water outlet |
| 7. Air intake pipeline | 8. Combustion-assistant material pipeline |
| 9. Air compressor unit | 10. Combustion chamber |
| 11. Turbine | 12. Tail jet pipe unit |
| 13. Pressurizing pipe unit | 14. Second combustion chamber |
| 15. Replenishing fuel nozzle | 16. Guide exhaust pipe unit |
| 17. Air intake check damper | 18. External air channel |
| 19. Tail jet pipe unit | 20. Fuel nozzle |
| 21. electrical pipeline | |

DETAILED DESCRIPTION OF THE EMBODIMENT

Figure 2:
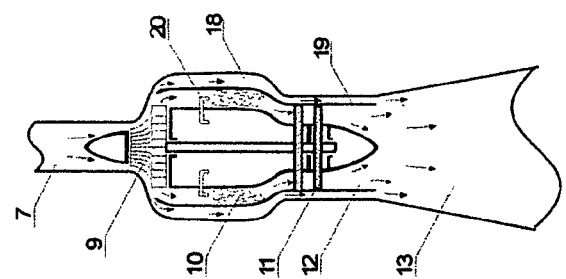
FIG. 2 is a schematic structural diagram of the turbine power combustion unit of the turbine submerged combustion boiler.
Figure 1:
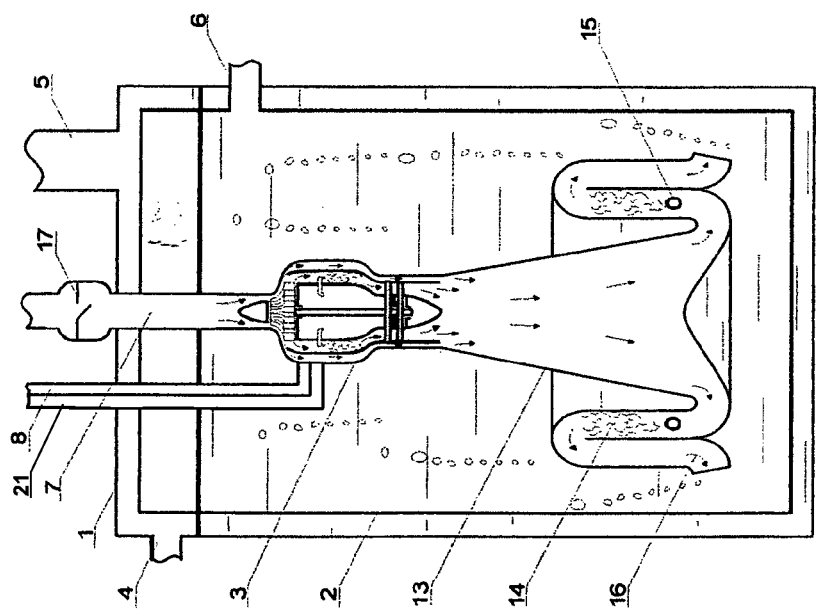
FIG. 1 is a schematic structural diagram of the turbine submerged combustion boiler of the present invention.

As shown in FIGS. 1 and 2, the turbine submerged combustion boiler of the present invention, including water tank 1, cold water inlet 4 and gas exhaust port 5 on top of water tank 1, flow guide cylinder 2 within water tank 1, hot water outlet 6 on the flow guide cylinder 2, turbine power combustion assembly 3 in the flow guide cylinder. Turbine power combustion unit 3 is connected with air intake pipeline 7 and fuel and assistant-materials pipeline 8 at the top. Inside turbine power combustion assembly 3, along the flow direction, there are an air compressor unit 9, a combustion chamber 10, an external air channel 18, a turbine 11, and a tail jet pipe unit 12. The pressurizing pipe unit 13 is connected with the outlet of the tail jet pipe unit 12 and outlet of external air channel 18. The secondary combustion chamber 14 is connected with the end of the pressurizing pipe unit 13. In the secondary combustion chamber 14, there are a replenishing fuel nozzle 15, and the guide exhaust pipe unit 16 connecting to secondary combustion chamber 14.

The air intake pipe 7 is equipped with the intake check valve 17.

The pressurizing pipe unit 13 is a smooth pipeline with a narrow inlet part and a wide outlet part.

The combustion chamber 10 of turbine power combustion assembly 3 is equipped with external air channel 18 on the outer layer. The front end of the external air channel 18 connects with the outlet of the air compressor unit 9 and its rear end connects with the pressurizing pipe unit 13.

The tail jet pipe 19 of the tail jet pipe unit 12 is of linear form or diffuser form at its terminal part.

When tank 1 is filled with water, air from the inlet check valve 17 passes through the air inlet pipe 7 to enter the combustion chamber 10. At the combustion chamber 10, it will be combined and combusted with the gas from fuel nozzle 20 and fuel from the assistant-materials pipe 8. The generated high temperature gas works on the turbine 11 of the turbine power combustion assembly 3. On one side, the turbine 11 will drive the air compressor unit 9 to draw air to sustain the combustion in combustion chamber 10. On the other side, it drives the high temperature gas passing through the tail jet pipeline 19 and then expels the gas to the pressurizing pipe unit 13. Meanwhile, the air from the air compressor unit 9 is expelled into the external air channel 18, as front end of the external air channel 18 connects with the outlet of the air compressor unit 9. Such air cools the combustion chamber 10 and the turbine 11 and then is expelled into the pressurizing pipe unit 13, by which the high temperature gas flows from external air channel 18 and tail jet pipeline 19 will be decelerated, its dynamic energy is reduced, and its pressure is increased. Next, it will enter the secondary combustion chamber 14. In the secondary combustion chamber 14, fresh replenishing fuel will be supplied via the replenishing fuel nozzle 15. The fuel will be combined with the excessive air within the high temperature gas to carry out the combustion completely. The completely combusted high temperature gas, guided by the guide exhaust pipe unit, will come out from the bottom of the water against water pressure and form high temperature micro-bubbles in the tank water. Under the combined effects from its dynamic energy and water buoyancy, the bubbles will collide and mix with tank water to conduct a direct heat exchange between the gas and tank water. When the bubbles float up to the water surface and are exhausted, the temperatures of the gas and tank water will be almost the same. Thus a complete heat exchange is accomplished.

Water in water tank 1 is supplied through the cold water inlet 4. Water passes through the loop shape inter-space between the flow guide cylinder 2 and the wall of water tank 1 to reach the tank bottom. Then it will flow into flow guide cylinder 2 to perform heat exchange with those high temperature bubbles. Finally it will be heated to a preset temperature and discharged from the hot water outlet 6 on the flow guide cylinder 2. Such a structure not only provides an orderly water flow route, optimizes heat exchange process, and also provides a beneficial cold-water insulating sleeve for the water tank.

During the combustion and heat exchange process, almost all combustion energy can be sufficiently used, except for such negligible losses from frictions, including some heat energy from combustion is transferred into mechanical energy used for air taking and combustion assisting, as well as pressing the high temperature gas generated from the combustion to the bottom of the water tank 1 against water pressure and then exhausted from the water. All the remaining heat energy is used to directly heat tank water via the high temperature gas. Furthermore, the submerged structure ensures there is no direct heat radiating route to the external environment, and makes the energy utilization efficiency of this system to be close to 100%.

The invented turbine submerged combustion method and boiler device can use fluid fuels, such as gas, oil, etc. The turbine power combustion assembly 3 is completely submerged into heated water. Fluid fuel and air will fully combust in the turbine power combustion assembly 3 submerged in water. The high temperature gas generated from combustion is expelled into water to produce a large amount of high temperature bubbles. When these high temperature bubbles mixed with water under a stirring effect, the heat energy carried by these bubbles will be transferred directly to their surrounding water at the gas-liquid interface, due to the temperature difference between the high temperature bubbles and tank water. Because the heat energy is transferred from these bubbles to water directly, there is no need for a heat exchange between the gas and water. Therefore, the limitation and obstruction associated with heat exchanger can be completely avoided. Through this mixing-phase heat exchange method, when it comes out from the water, the temperature of high temperature bubbles will be almost as low as the tank water. Thus it ensures a sufficient and quick heat exchange; At the same time, pollutions and impurities contained in the high temperature bubbles will be filtered and cleaned by water.

The core structure of the submerged turbine combustion boiler is its turbine power combustion assembly 3. The unique functionality of the present invention resides in this structure. During the combustion process, it can convert a part of the heat energy into mechanical energy to take in sufficient air and drive it to the combustion chamber 10 against water pressure, to ensure a proper combustion operation underwater. In comparison to the conventional turbine engines, the turbine power combustion boiler of the present invention only transfers the necessary heat energy to mechanical energy, not transfer heat energy to mechanical energy as much as possible. The necessary energy is referred as the energy used to overcome the water pressure and induce enough air into the combustion chamber to sustain the combustion. And the thermal efficiency of the turbine power combustion assembly may be reduced if too much energy is transferred into mechanical energy. Since the "air supply" and "combustion" systems are integrated into one structure, no power-consumable blower equipments is required; hence the power structure of the turbine submerged combustion boiler device—is simple and its cost is low.

This turbine power combustion assembly is preferred to use air bearing, which is free of oil lubrication and therefore is helpful to reduce water pollution.

The above stated implementation example is only one kind of implementing method of this invention and any general modification and substitution within the technical scheme range of this invent conducted by technicians of this field shall be regarded as being covered by the protective range of this invention.

The invention claimed is:

1. A submerged turbine combustion boiler, comprising: a water tank, a flow guide cylinder in the water tank, a turbine-powered combustion assembly in the flow guide cylinder, a water inlet and a gas exhaust port arranged on the top of the water tank, a hot water outlet arranged on the flow guide cylinder, and an air intake pipeline, a combustion-assistant material pipeline, and an electrical pipeline connected to the front of the turbine-powered combustion assembly, wherein, counted in the gas flow direction, the turbine-powered combustion assembly comprises an air compressor unit, a combustion chamber, a turbine, and a tail jet pipe unit; wherein, the outlet of a tail jet pipe on the tail jet pipe unit of the turbine-powered combustion assembly communicates with a pressurizing pipe unit, and the bottom of the pressuring pipe unit communicates with a secondary combustion chamber; the secondary combustion chamber is arranged with a replenishing fuel nozzle in it, and communicates with a guide exhaust pipe unit.

2. The submerged turbine combustion boiler as set forth in claim 1, wherein, an air intake check valve is arranged in front of the air intake pipeline.

3. The submerged turbine combustion boiler as set forth in claim 1, wherein, the pressurizing pipe unit is a smooth pipeline, with a narrower inlet part and a wider outlet part.

4. The submerged turbine combustion boiler as set forth in claim 1, wherein, an external air channel is arranged on an outer layer of the turbine-powered combustion assembly, the front end of the external air channel communicates with the outlet of the air compressor unit, and the rear end of the external air channel communicates with the pressurizing pipe unit.

5. The submerged turbine combustion boiler as set forth in claim 1, wherein, the terminal part of the tail jet pipe unit is in a linear form.

6. The submerged turbine combustion boiler as set for in claim 1, wherein, the terminal part of the tail jet pipe unit is in a diffuser form.

* * * * *